March 27, 1951 V. A. RAYBURN ET AL 2,546,374
CONVEYER
Original Filed Dec. 21, 1945 7 Sheets-Sheet 1

INVENTORS
V. A. RAYBURN
D. C. ROBSON
BY
ATTORNEY

INVENTORS
V. A. RAYBURN
D. C. ROBSON
BY
ATTORNEY

INVENTORS
V. A. RAYBURN
D. C. ROBSON

BY
ATTORNEY

March 27, 1951 V. A. RAYBURN ET AL 2,546,374
CONVEYER
Original Filed Dec. 21, 1945 7 Sheets-Sheet 4
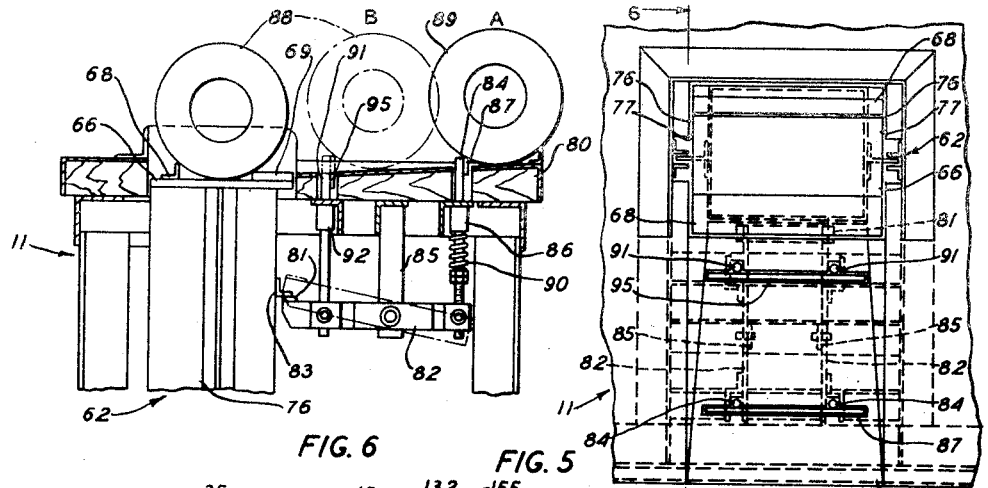
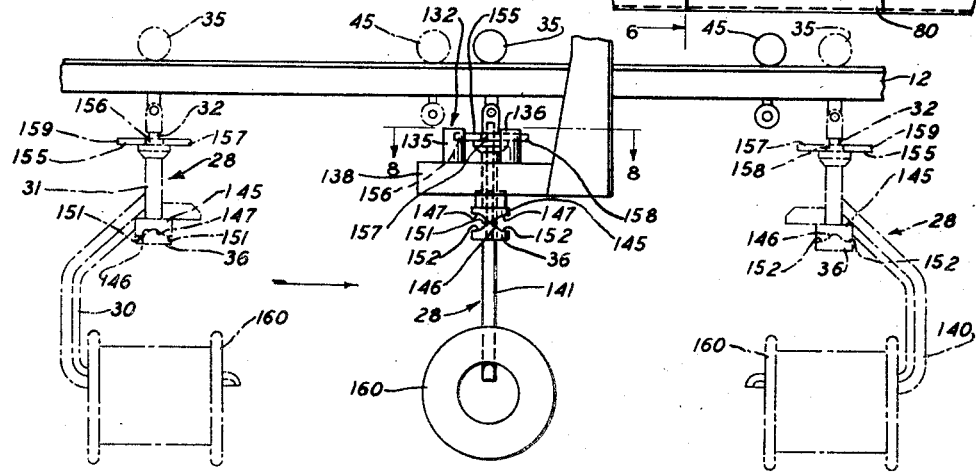
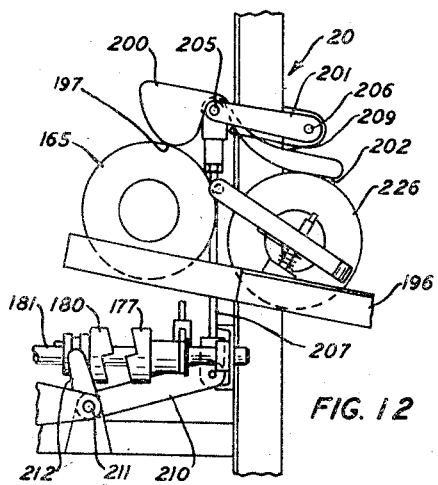
INVENTORS
V. A. RAYBURN
D. C. ROBSON
BY
ATTORNEY

INVENTORS
V. A. RAYBURN
D. C. ROBSON
BY
ATTORNEY

March 27, 1951  V. A. RAYBURN ET AL  2,546,374
CONVEYER

Original Filed Dec. 21, 1945  7 Sheets-Sheet 6

INVENTORS
V. A. RAYBURN
D. C. ROBSON

BY [signature]
ATTORNEY

March 27, 1951　　　V. A. RAYBURN ET AL　　　2,546,374
CONVEYER
Original Filed Dec. 21, 1945　　　7 Sheets-Sheet 7
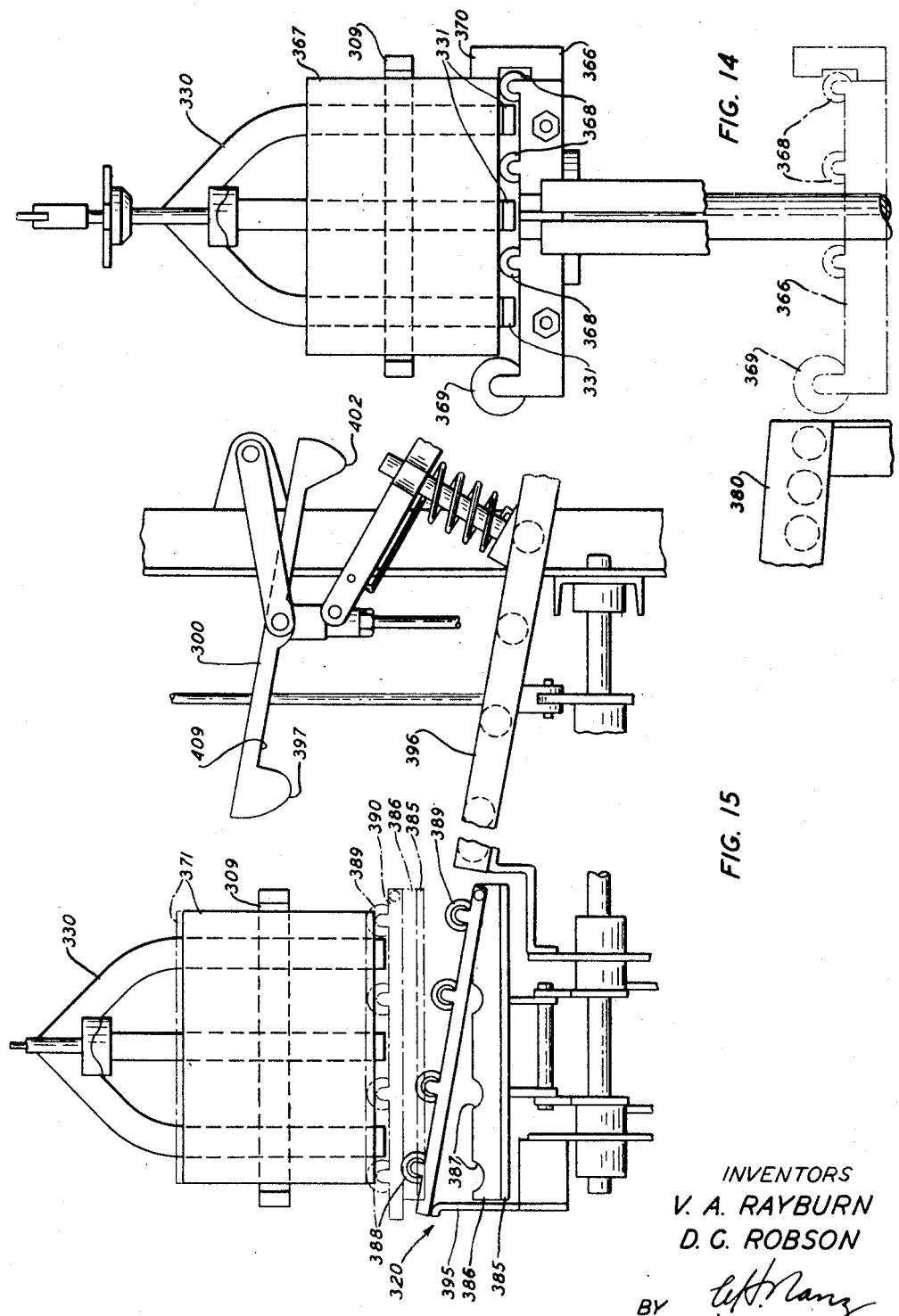
INVENTORS
V. A. RAYBURN
D. C. ROBSON
BY *[signature]*
ATTORNEY Patented Mar. 27, 1951

2,546,374

UNITED STATES PATENT OFFICE 2,546,374

CONVEYER

Vincent A. Rayburn and Duer C. Robson, Baltimore, Md., assignors to Western Electric Company, Incorporated, New York, N. Y., a corporation of New York Original application December 21, 1945, Serial No. 636,404. Divided and this application January 8, 1948, Serial No. 1,156

7 Claims. (Cl. 198—20)

This invention relates to conveyers, and more particularly to conveyers for transporting reels.

This application is a division of copending application Serial No. 636,404, filed December 21, 1945, for "Conveyer Unloader".

In the operation of machines for making articles from wire, large numbers of reels of wires must be transported to the machines. For the greatest ease in the operation of such machines, reserve supplies of the reels of wire must be positioned at an easily accessible location relative to the machines. However, heavy reels are difficult to move and require large amounts of labor to transport them to positions conveniently located with respect to the machines.

An object of the invention is to provide new and improved conveyers.

A conveyer illustrating certain features of the invention may include a plurality of hooks, means for advancing the hooks along a predetermined path, means for orienting the hooks, and means for loading articles on the hooks. The means for loading articles on the hooks includes an elevator for raising the articles successively in the path of the hooks, and a control system for controlling the operation of the elevator.

A complete understanding of the invention may be obtained from the following detailed description of a conveyer forming a specific embodiment thereof, when read in conjunction with the appended drawings, in which:

Fig. 5 is an enlarged, fragmentary, horizontal section taken along line 5—5 of Fig. 2;

Fig. 6 is an enlarged, fragmentary, vertical section taken along line 6—6 of Fig. 5;

Fig. 7 is an enlarged, fragmentary, vertical section taken along line 7—7 of Fig. 1;

Fig. 8 is an enlarged, fragmentary, horizontal section taken along line 8—8 of Fig. 7;

Fig. 12 is an enlarged, fragmentary, vertical section similar to Fig. 11 showing some of the parts in different positions;

Fig. 14 is an enlarged, fragmentary, vertical section showing a portion of a conveyer forming an alternative embodiment of the invention; and Fig. 15 is an enlarged, fragmentary, vertical section somewhat similar to Fig. 11 showing a portion of the conveyer shown in Fig. 14.

Figure 1:
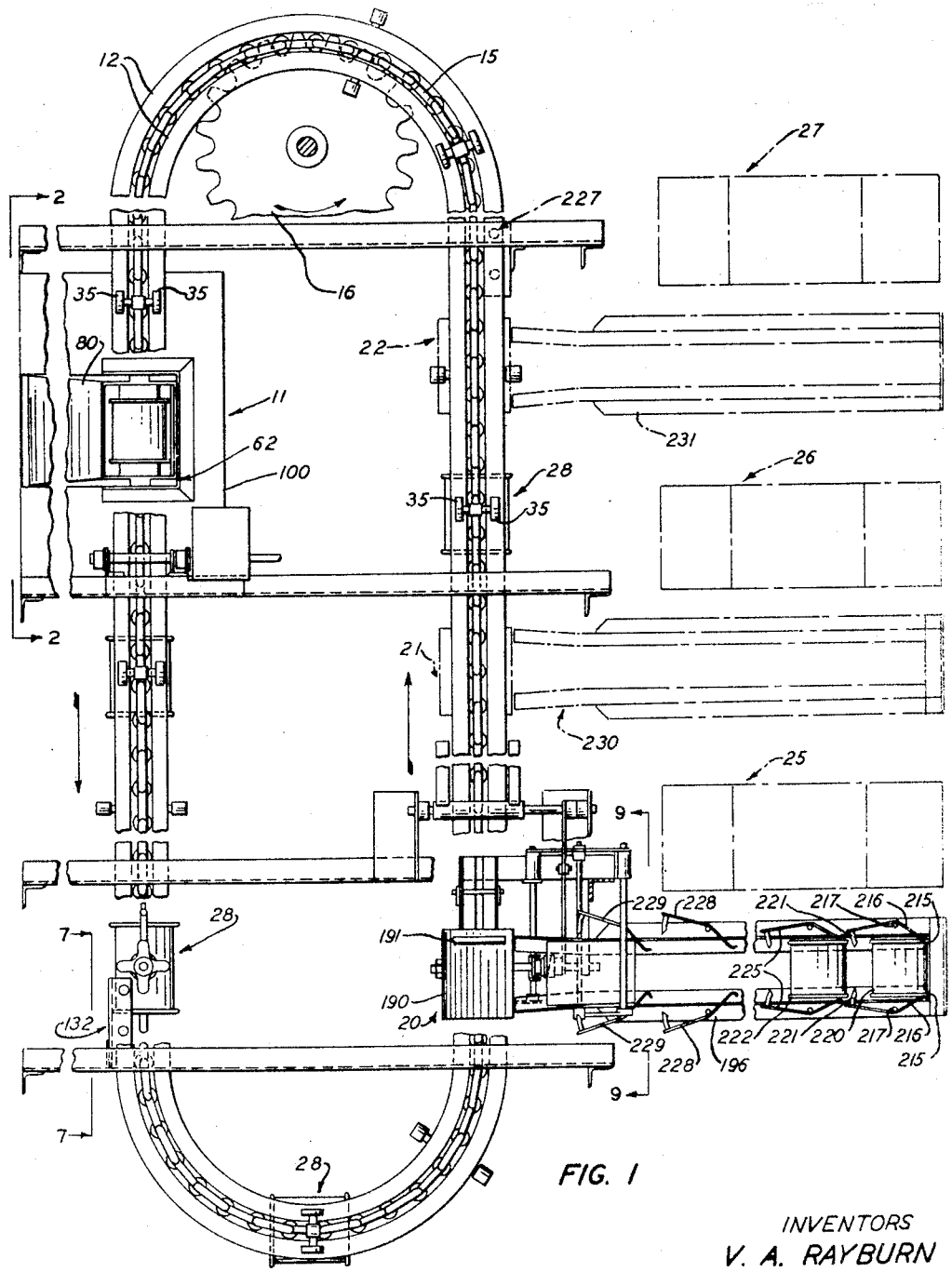
Fig. 1 is a top plan view of a conveyer forming one embodiment of the invention.

Referring now in detail to the drawings there is shown therein a conveyer, which includes a loader 11 and tracks 12—12 serving to guide an endless roller chain 15. The chain 15 is advanced between the tracks 12—12 by a sprocket 16 past the loader 11 and unloaders 20, 21 and 22 to serve machines 25, 26 and 27 positioned adjacent to the unloaders 20, 21 and 22, respectively.

Each of a plurality of hook assemblies 28—28 (Figs. 1 and 2) includes a hook 30 secured to a sleeve 31 supported by a shaft 32 having a two-lobe cylindrical cam 36 secured to the end thereof. The shaft 32 is connected pivotally to the chain 15 by a pin 33, and is supported by support rolls 35—35 (Fig. 3) resting on the tracks 12—12. A pair of trip rolls 45—45 is carried by the chain at a point a predetermined distance in advance of the hook assembly and precedes the hook as the chain 15 carries the hook beneath the tracks 12—12.

Figure 2:
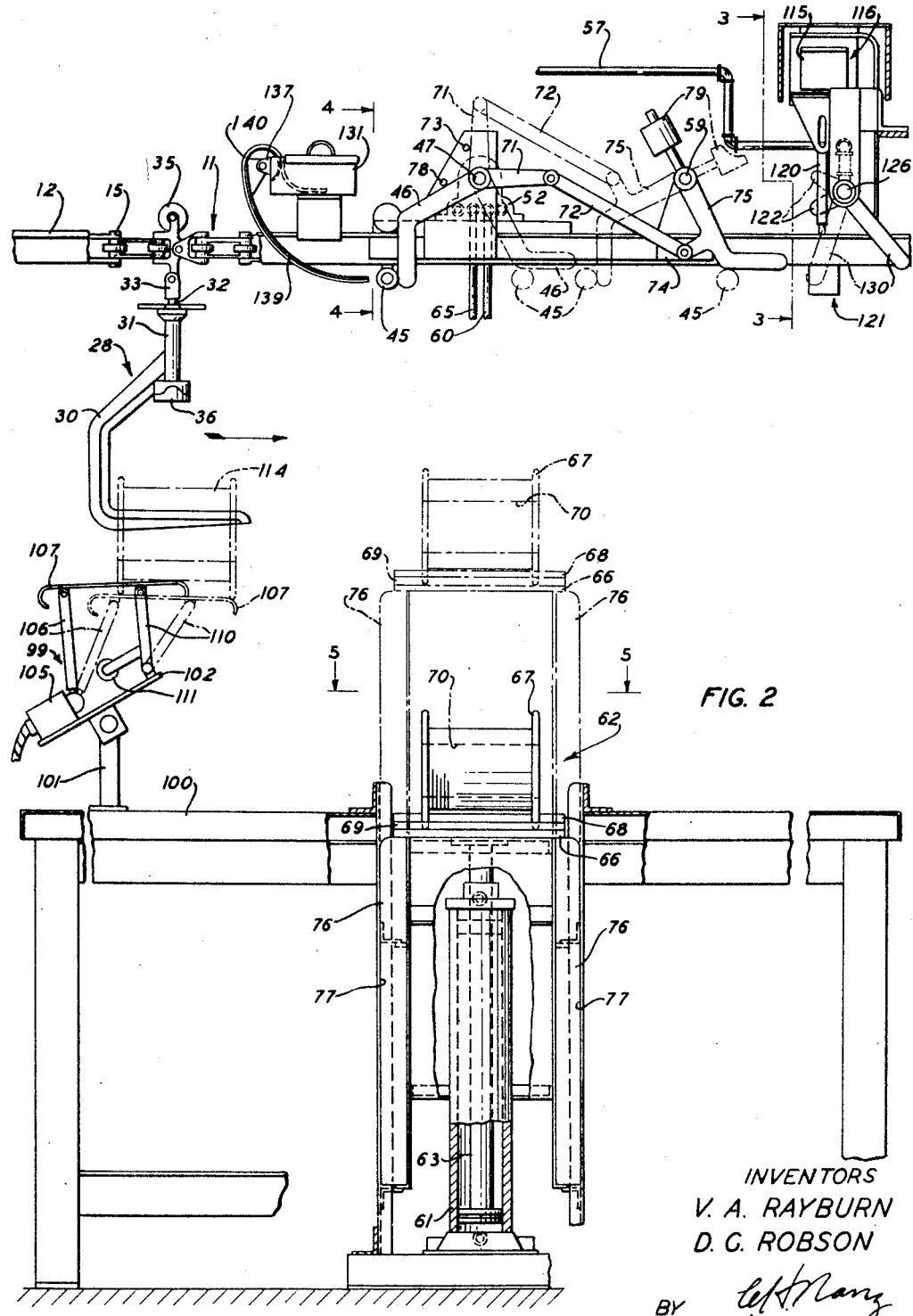
Fig. 2 is an enlarged, fragmentary, vertical section taken along line 2—2 of Fig. 1.

When one of the hook assemblies 28—28 is advanced toward the loader 11, the trip rolls 45—45 engage L-shaped cams 46—46 (Figs. 2 and 4) rigidly connected to a shaft 47, which is pivotally mounted in bearings 50—50 formed on mounting plates 51—51, and move the L-shaped cams from their full-line positions, as shown in Fig. 2, to their broken-line positions. When the cams 46—46 are moved from their full-line positions to their broken-line positions, the shaft 47 is rotated in the bearings 50—50 and actuates a four-way valve 52. A pipe 55 (Fig. 3) serves to connect the four-way valve 52 to a normally open valve 56, which is connected to a pipe 57 leading to a supply of compressed air (not shown).

When the four-way valve 52 (Fig. 2) is actuated, as described hereinabove, it serves to connect the pipe 55 (Fig. 3) to a pipe 60 (Fig. 2), whereby the lower portion of a cylinder 61 of a hoist 62 is supplied with compressed air, and a piston 63 then is forced upwardly, as viewed in Fig. 2. A pipe 65 connected to the upper portion of the cylinder 61 and to the valve 52 serves to exhaust the air from the upper portion of the cylinder. When the piston is moved upwardly, a reel 67 positioned on a carriage 66 between a stop 68, and a stop-bumper 69 is lifted into the path of the hook 30. The hook assembly 28 continues to advance to the right, as viewed in Fig. 2, and the hook enters a core hole 70 formed in the reel 67.

Projections 71—71 of the cams 46—46 (Figs. 2 and 4) are moved against stop pins 73—73 when the L-shaped cams 46—46 are moved from their full-line positions to their broken-line positions shown in Fig. 2, and move cams of which an L-shaped cam 75 is shown to their broken-line positions, as shown in Fig. 2, and the ends thereof project into the paths of trip rolls 45—45. The L-shaped cams 75—75 are connected to the projections 71—71 (Fig. 2) by connecting links of which connecting link 72 is shown. The cams 75—75 are rigidly secured to a shaft 59 rotatably mounted on a bracket 74.

When the linkage system just described is moved to its broken-line position, an overcenter counterweight 79 fastened to the shaft 59 is moved to its broken-line position and holds linkage system in its broken-line position. The stop pins 73—73 limit the movement of the linkage system of which the cams 46—46 and 75—75 and the counterweight 79 are a part. Thus, after the cams 75—75 are moved to their broken-line positions and the hook 30 has entered the core hole 70 in the reel 67, the trip rolls 45—45 engage the cams 75—75, and move them from broken-line positions to full-line positions, and the links 72—72 cause the shaft 47 to be rotated in a clockwise direction, as viewed in Fig. 2, and the cams 46—46 to be moved against stop pins 78—78 (Figs. 2 and 4), in which positions the extremities thereof, project below the tracks 12—12 into the path of subsequent trip rolls 45—45.

When the rod 47 is so rotated, the valve 52 is reversed, whereby compressed air is supplied by the pipe 65 to the upper portion of the cylinder 61 and is exhausted by the pipe 60 from the lower portion of the cylinder 61. The piston 63 and the carriage 66 of the hoist 62 then are lowered and the reel 67 having the hook 30 projecting through the core hole 70 thereof is retained on the hook 30. As the piston 63 and the carriage 66 are lowered, guide shoes 76—76 secured to the carriage 66 slide downwardly along guideways 77—77 and guide the carriage 66 to its lowermost position. When the cams 75—75 are moved to their full-line positions, the overcenter counterweight 79 is moved to its full-line position, holds the cam 46—46 against the pins 78—78 and prevents accidental actuation of the valve 52.

When the carriage 66 is in its lowermost position, the top of the stop bumper 69 is flush with the lower edge of an inclined ramp 80 (Figs. 5 and 6), and a keeper angle 83 secured to the guide shoes 76—76 engages a cross bar 81 secured to the ends of a pair of escapement levers 82—82 mounted pivotally on brackets 85—85 and rotates the levers 82—82 in a counterclockwise direction, as viewed in Fig. 6, whereby pins 84—84 carrying a cross bar 87 and mounted in slide bearings, of which a bearing 86 is shown, are projected above the upper surface of the ramp against the actions of compression springs illustrated by a compression spring 90. Also, when the levers 82—82 are so rotated in a counterclockwise direction, as viewed in Fig. 6, rods 91—91 (Fig. 5) carrying a cross-bar 95 are caused to recede from positions projecting above the upper surface of the ramp 80 to positions therebelow, whereby a reel 88 positioned on the ramp 82 is free to roll over the cross-bar 95 and down the ramp to a position between the stop bumper 69 and the stop 68. A reel 89 then is placed on the ramp in the position designated A thereon and is held in that position by the cross-bar 87.

When the carriage 66 and the plungers 76—76 are moved upwardly for the next loading operation, the compression springs 90—90 urge the levers 82—82 from their full-line positions, as shown in Fig. 6, to their broken-line positions, whereby the cross-bar 87 is drawn beneath the upper surface of the ramp 80 to permit the reel 89 to roll down the ramp, and the cross-bar 95 is projected above the surface of the ramp 80 to engage the reel 89 and hold it in a position designated B in the drawings. Then, as the hoist 62 is lowered, the keeper angle 83 engages the bar 81 and causes the cross-bar 95 to be withdrawn from the path of the reel 89 which rolls down the ramp 80 onto the hoist 62. Another reel (not shown) may then be placed in the position designated A in the drawings for repeating the operation.

A detector 99 includes a mounting post 101 projecting from a platform 100 of the loader 11. The mounting post carries a mounting plate 102, which supports a normally open limit switch 105 thereon. An alarm 103 serves to close the limit switch 105 thereon. An arm 106 serves to close the limit switch 105 when it is moved from its full-line position to its broken-line position, shown in Fig. 2. A wiper shoe 107 is pivotally connected to the arm 106 and to an arm 110, which is pivotally mounted on the plate 102. The arm 110 is shorter than the arm 106, and supports a counterweight 111. The counterweight maintains the wiper shoe in its full-line position, as shown in Fig. 2, at which time the contacts of the limit switch 105 are open. The right end of wiper shoe, as viewed in Fig. 2, is directed slightly upwardly when the detector 99 is in its normal position, which is shown in full lines, but is directed slightly downwardly when the detector is in its actuated position, which is shown in broken lines. This is due to the fact that the arm 110 is shorter than the arm 106 so that the wiper shoe forms a modified pantograph linkage with the arms 106 and 110 and the mounting plate 102.

When one of the hook assemblies 28—28 carries a reel 114 as it approaches the hoist 62 and before the trip rolls 45—45 engage the L-shaped cams 46—46, the reel 114 engages the wiper shoe 107 and moves it from its full-line position to its broken-line position, whereby the contacts of the limit switch 105 are closed. The contacts of the limit switch are in series with a winding 115 of a solenoid 116, and, when they are closed, the winding of the solenoid is energized whereby an armature 117 (Fig. 3) of the solenoid is raised. A rod 120 connected to the armature is raised with the armature against the action of a dashpot 121.

Figure 3:
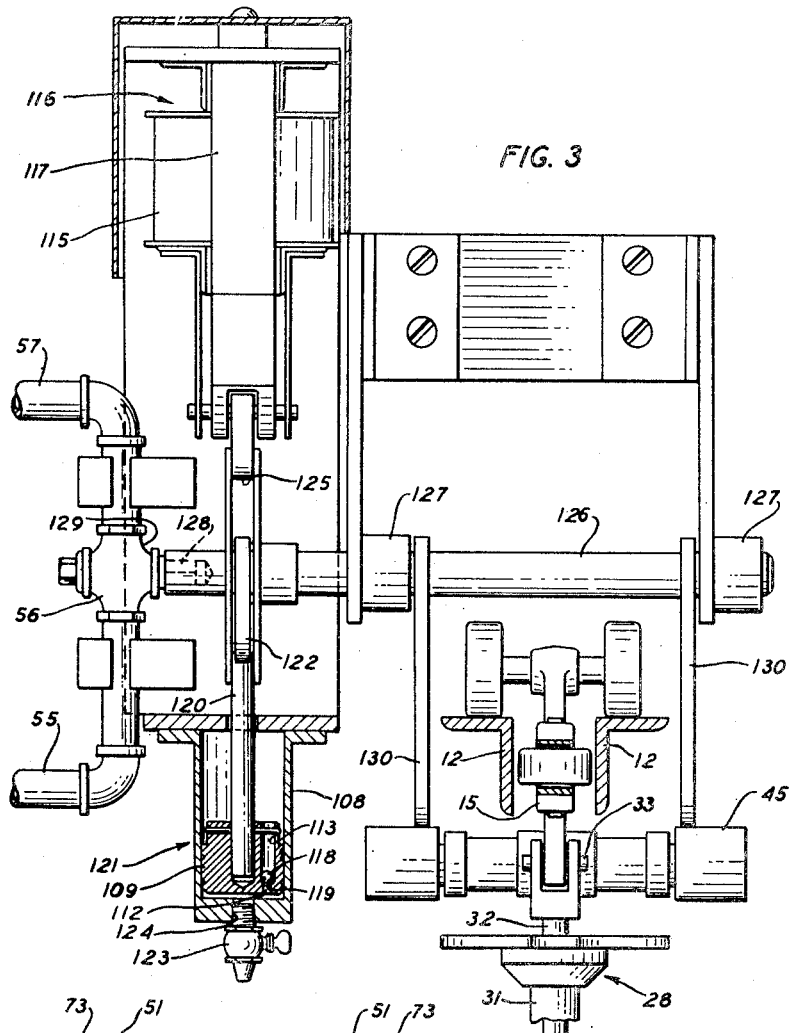
Fig. 3 is an enlarged, fragmentary, vertical section taken along line 3—3 of Fig. 2.
Figure 4:
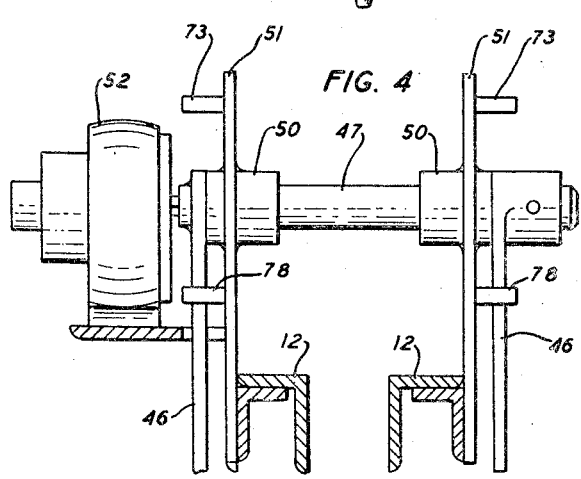
Fig. 4 is an enlarged, fragmentary, vertical section taken along line 4—4 of Fig. 2.

The dashpot 121 includes a cylinder 108 slidably enclosing a piston 109 mounted on the lower end of the rod 120, as viewed in Fig. 3. The piston 109 has formed therein a bore 112 and a counterbore 113 extending upwardly from the bore 112. The counterbore forms a loose guide passage for a ball 118, which normally rests on a valve seat 119 at the lower end thereof. An adjustable needle valve 123 is threaded into a tapped bore 124 formed in the head end of the cylinder 108. When the solenoid 116 is actuated, it raises the rod 120 and the piston 109. As the piston 109 is raised in the cylinder 108, a partial vacuum is created in the portion of the cylinder 108 below the piston 109, which vacuum is relieved gradually by only the needle valve 123, because the ball 118 is pressed by gravity and the differential pressures of the air into contact with the valve seat 119. The vacuum so produced retards the upward movement of the piston 108, the rod 120 and the armature 117 so that the impact shocks and rebound of the armature and the rod 120 are prevented. When the solenoid winding 115 is deenergized and the armature is released, the weight (gravity) of the piston and rod increases the pressure of the air below the piston to above atmospheric pressure, and the air below the piston 109 pushes the ball 118 away from the valve seat 119 and escapes into the upper portion of the cylinder 108 so that the return of the rod 120, the armature and the piston 108 are not materially impeded and can fall promptly.

An arm 122 projects into an elongated slot 125 formed in the rod 120 and is rigidly connected to a shaft 126. The shaft 126 rotatably mounted in bearings 127—127 is rotated in a clockwise direction, as viewed in Fig. 2, when the winding 115 of the solenoid 116 is actuated, at which time the arm 122 is rotated in a clockwise direction by the rod 120. When the shaft 126 is rotated, it closes the valve 56, which shuts off the supply of compressed air to the valve 52 (Fig. 4) and therefore to the hoist 62. Thus, when the trip rolls 45—45 turn the cams 46—46 (Fig. 4) to actuate the valve 52, the hoist 62 cannot be raised. The hook assembly 28 carrying the reel 114 then is advanced to the right, as viewed in Fig. 2, until the reel 114 clears the shoe 107. The counterweight 111 then causes the arms 106 and 110 and the shoe 107 to return to their full-line positions, whereby the contacts of the limit switch 105 are opened and the circuit to the winding 115 of the solenoid 116 is broken so that the armature 117 (Fig. 3) and the plunger 120 then drop by gravity. However, the arms 122 and 130 remain in their broken-line positions, as viewed in Fig. 2, due to the tightness of a valve stem 128 of the valve 56 in a housing 129 thereof, and the friction of the bearings 127—127 (Fig. 3) on the shaft 126 so that the valve 56 remains closed.

Thus, when the four-way valve 52 is actuated by the trip rolls 45—45 preceding the hook assembly 28, the hoist 62 is not actuated. The trip rolls 45—45 then strike successively the cams 46—46 and the cams 75—75. After the trip rolls 45—45 have struck the cams 75—75 and have returned them from their broken-line positions, as shown in Fig. 2, to their full-line positions, the trip rolls 45—45 strike cams 130—130 and move the cams from their broken-line positions, as shown in Fig. 2, to their full-line positions, whereby the valve 56 (Fig. 3) is opened. However, by the time that the valve 56 is opened in this manner, the four-way valve 52 has been closed so that the hoist 62 (Fig. 2) is not raised.

The chain 15 carries the hook assemblies 28—28, which are spaced therealong, and also carries trip rolls 45—45 positioned a predetermined distance in advance of the hook assemblies. When one of the hook assemblies 28—28 having no reel thereon moves toward the loader 11, the trip rolls 45—45 associated therewith actuate the four-way valve 52 and air is supplied to the cylinder 61 of the hoist 62 and a reel thereon is elevated for loading on this hook assembly.

A lubricator, which is disclosed and claimed in D. C. Robson Patent No. 2,471,978, issued May 31, 1949, includes a tank 131 for containing a supply of oil. A bracket 137 pivotally mounts a pair of metallic arms, of which a metallic arm 139 is shown, on which arms wicks illustrated by a wick 140 are fitted. The lower portions of the arms 139—139 are slightly curved and normally hang in paths of the trip rolls 45—45. The upper portions of the arms 139—139 are curved about a relatively short radius, and normally engage the inside of the tank, thereby limiting the downward movement of the lower portions of the arms 139—139. The upper end portions of the wicks are free and are positioned in the supply of oil in the tank, whereby the oil permeates all of the unimmersed portions of the wicks by capillary action. As the trip rolls 45—45 are advanced along the tracks 12—12, the trip rolls are wiped by the wicks, whereby the trip rolls are coated with oil.

The hook assemblies 28—28 are advanced one at a time from the loader 11 past a turner 132 (Fig. 7). The construction of the hook assemblies and the turner is disclosed and claimed in V. A. Rayburn Patent 2,471,347, issued May 24, 1949. The turner 132 includes rack pins 135 and 136, which are rigidly mounted adjacent to the path of the hook assemblies by a base 138. The cam 36 of the hook assembly fastened to the shaft 32 meshes with a two-lobe cylindrical cam 145 formed on the lower end of the sleeve 31. The cam 36 has formed thereon a pair of lobes, illustrated by a lobe 146, which fit into depressions 147—147 formed in the two-lobe cylindrical cam 145. The cam 145 includes a pair of lobes 151—151 which fit into depressions 152—152 formed in the cam 145. The lobes illustrated by the lobe 146, the lobes 151—151 and the depressions 147—147 and 152—152 serve to index and lock the hook 30 in either a position in which it is pointed in the direction of travel of the chain 15 or a position in which it is pointed a direction thereof, opposite to that in which the chain 15 is advanced. When the hooks 30—30 leave the loader 11, they point in the direction in which they are being moved.

As each hook assembly 28 is advanced past the turner 132, a four-tooth pinion 155 formed on the sleeve 31 and having teeth 156, 157, 158 and 159 engages the rack pin 135 of the turner 132 and the pin 135 retards the advancement of the tooth 156 whereby the hook 30 and the sleeve 31 are rotated 90°. This causes the tooth 157 to project between the rack pins 135 and 136 and to engage the rack pin 136 as the hook assembly 28 is moved toward the right, as viewed in Fig. 8. The post 136 then retards the advancement of the tooth 157, whereby the sleeve 31 and the hook 30 are rotated 90° further in a clockwise direction. The hook 30 then is oriented to a position pointing in a direction opposite to that in which it is being advanced so that a reel 160 positioned thereon may be stripped from the hook without interference thereby merely by retarding the advancement of the reel 160 relative to the hook. The lobes, illustrated by the lobe 146 (Fig. 7), the lobes 151—151 and the depressions 147—147 and 152—152, serve to prevent accidental turning of the hook after it has been rotated to the position in which it faces in a direction opposite to that direction in which it is advanced.

Figures 9, 10:
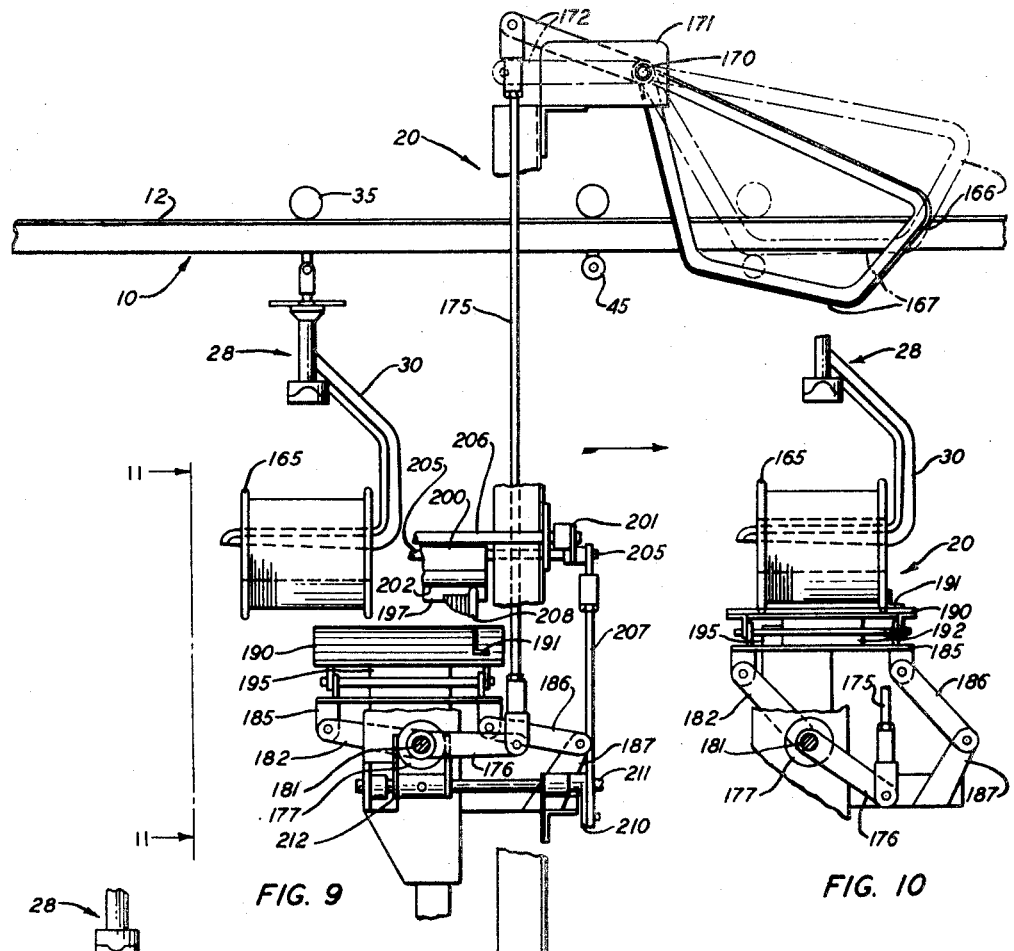
Fig. 9 is an enlarged, fragmentary, vertical section taken along line 9—9 of Fig. 1.
Fig. 10 is an enlarged, fragmentary, vertical section similar to Fig. 9.

After the hooks 30—30 have been turned by the turner 132 (Fig. 1) so that they point in directions opposite to those in which they are advanced by the conveyer chain 15, the hook assemblies are advanced one at a time past the unloader 20 and the trip rolls 45—45 engage cams of which a cam 166 is shown and move these cams from their full-line positions, as shown in Fig. 9, to their broken-line positions. The cams 166—166 are rigidly fastened to a shaft 170 mounted on a bracket 171 and serve to rotate the shaft 170 in counterclockwise direction, as viewed in Fig. 9, when they are moved from their full-line positions to their broken-line positions, whereby an arm 172 rigidly mounted on the shaft 170 is moved from its full-line position to its broken-line position.

When the arm 172 is rotated from its full-line position to its broken-line position, it moves a link 175 connected thereto downwardly, as viewed in Fig. 9, so that an arm 176 is rotated in a clockwise direction. The arm 176 is connected rigidly to a driving clutch member 177 (Figs. 9 and 11) rotatably mounted on a shaft 131. The driving clutch member normally engages a driven clutch member 180 (Fig. 11) splined to the shaft 181, and if engaged therewith, rotates the driven clutch member and the shaft in a clockwise direction, as viewed in Fig. 9, when the driving clutch member 177 is rotated. The shaft 181 serves to rotate arms 182—182 (Figs. 9 and 11), which raise a table 185, which is pivotally connected thereto and to arms, of which an arm 186 (Fig. 10) is shown, connected to a bracket 187. The arms 186—186 are rotated from their positions shown in Fig. 9 to their positions shown in Fig. 10 when the arms 182—182 are rotated by the shaft 181 from their positions shown in Fig. 9 to their positions shown in Fig. 10, whereby the table 185 is raised. The arms 182—182 are the same length as and are parallel with the arms 186—186 so that they form a pantograph linkage with the table 185 and support the table 185 in a horizontal position regardless of the positions of the arms 182—182 and 186—186.

Figure 11:
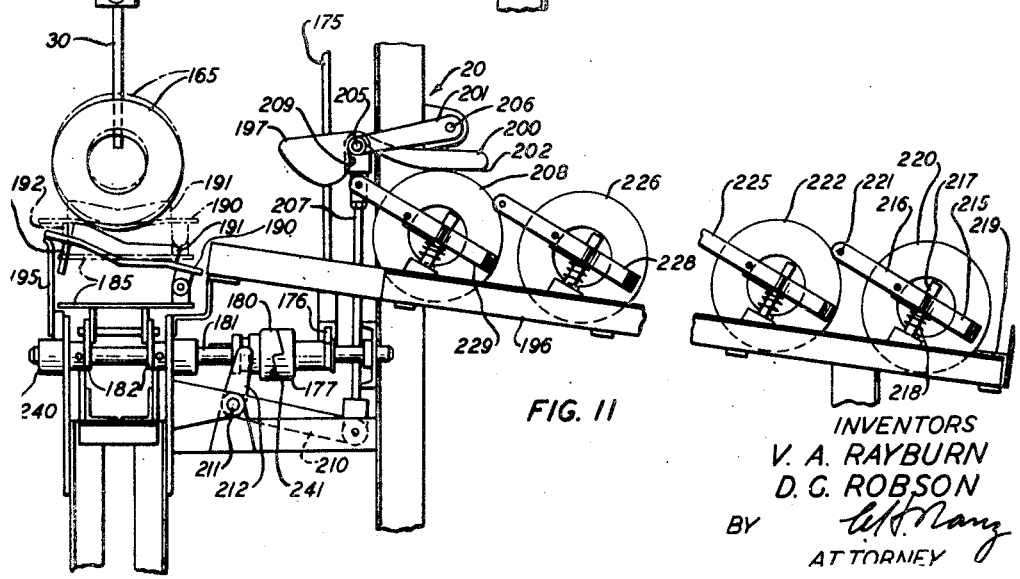
Fig. 11 is an enlarged, fragmentary, vertical section taken along line 11—11 of Fig. 9.
Figure 13:
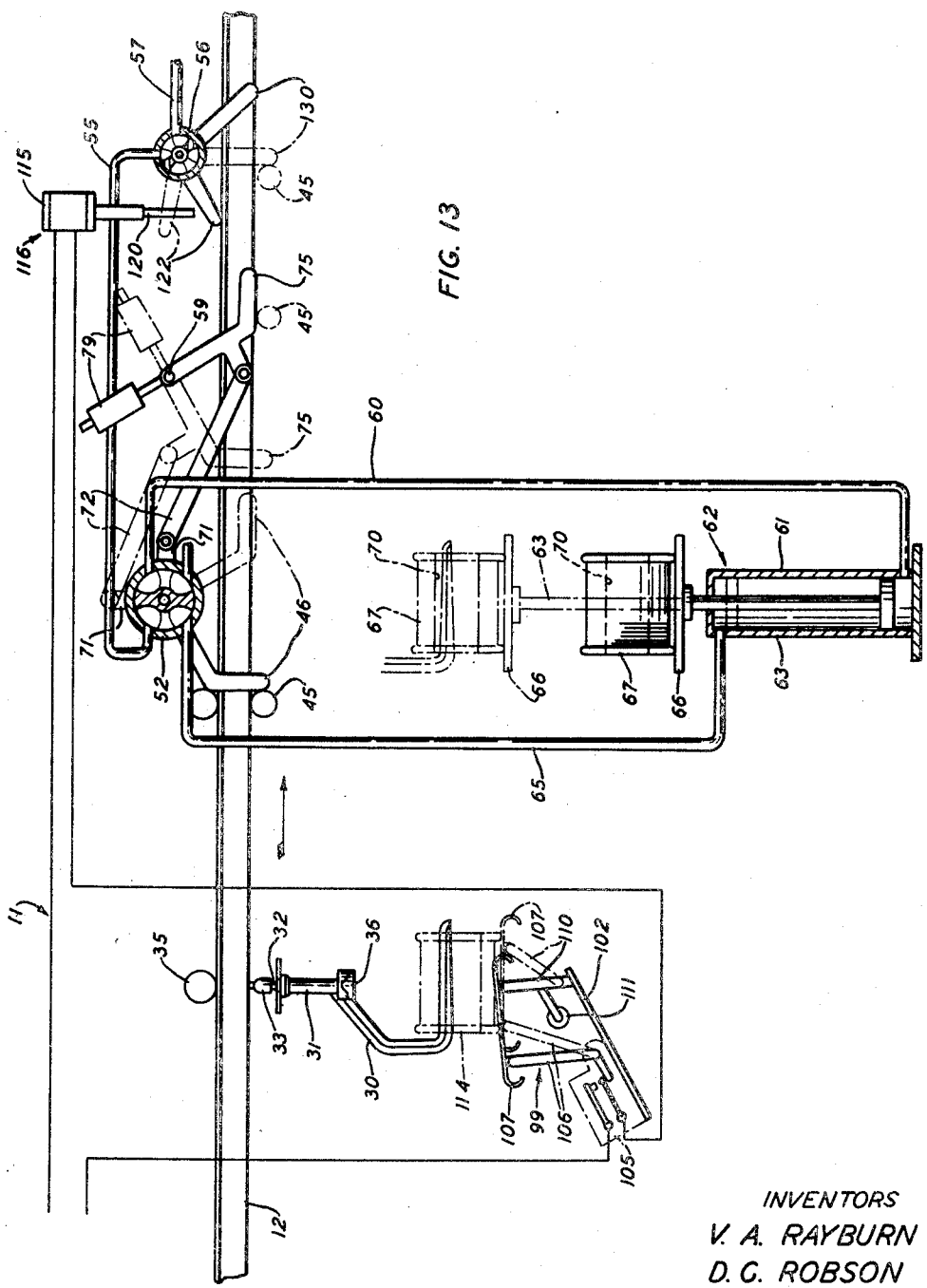
Fig. 13 is a schematic view similar to Fig. 2.

As the table 185 is raised, it raises a concave receiving platform 190 (Fig. 11) from its full-line position shown in Fig. 11 to its broken-line position. The receiving platform 190 is pivotally secured to the table 185 and is tilted by a stop 195 downwardly toward the right when the table 185 is in its full-line position. However, as the table 185 is raised from its full-line position to its broken-line position, a leg 192 depending from the under side of the platform 190 engages the table, whereby the platform 190 is held in a horizontal position.

When the table 185 is moved from the full-line position shown in Fig. 11, to its broken-line position, the receiving platform 190 engages, lifts and holds the reel 165 from the hook 30. A stop 191 positioned on the platform 190 serves to retard the advancement of reel 165, and as the hook assembly 28 continues to move to the right, as viewed in Fig. 10, the reel 165 is stripped from the hook 30. After the hook has been withdrawn from the reel 165, the trip roll 45 (Fig. 9) is advanced out of engagement with an elongated dwell portion 167 of the cam 166, and the weight of the reel together with the weight of the cam 166 forces the platform 190 and the table 185 to their full-line positions shown in Fig. 11.

As the table 185 and the platform 190 are lowered from their broken-line positions shown in Fig. 11 to their full-line positions, the left side of the platform 190 engages the stop 195 and the platform 190 tilts downwardly and to the right. The reel 165 then rolls from the receiving platform 190 onto a ramp 196 and engages a cam portion 197 (Figs. 9 and 12) of a rider 200 and raises the cam portion 197. The rider 200 is pivoted freely on a rod 205 secured to levers 201—201, which are mounted pivotally on a rod 206. A cam portion 202 of the rider 200 rests on a reel 208 previously unloaded onto the ramp 196, which is filled by the arrival of the reel 165 thereon. Thus, when the reel 165 engages the cam portion 197 of the rider 200, the rider is raised from its position shown in Fig. 11 to its position shown in Fig 12, whereby the rod 205 is raised and raises a link 207 connected thereto. When the link 207 is raised, it pivots an arm 210 in a counterclockwise direction, as viewed in Fig. 12, whereby a shaft 211 and a yoke 212 connected to the driven clutch member 180 are rotated in a counterclockwise direction. When the yoke 212 is so rotated, it moves the driven clutch member 180 out of engagement with the driving clutch member 177. Consequently, when the chute 196 is filled and a hook assembly following the hook assembly just unloaded approaches the unloader 20, the receiving platform 190 will not be raised when the cams 166—166 (Fig. 9) are actuated by trip rolls associated with that hook assembly, and reels carried thereby will not be stripped therefrom. Hence, overloading of the ramp 196 is prevented.

If the portion of the ramp 196 occupied by the reel 208 had been vacant when the reel 165 was discharged onto the ramp 196, the rider 200 would merely rock on the rod 205 because a recess 209 of the rider would provide clearance for the reel 165 so that the rider as a whole would not be raised and would not raise the rod 205 when engaged by the reel 165 rolling down the ramp 196. Thus, the driven clutch member 180 normally remains in engagement with the driving clutch member 177 until the ramp 196 is filled. The rider 200 and the elements associated therewith do not impede the movement of the reels on the ramp 196 but prevent the operation of the unloader 20 when the ramp 196 is filled.

A pair of L-shaped escapement levers 216—216 (Figs. 1 and 11) are rotatably mounted on posts 217—217 projecting from curbs of the ramp 196, and cam portions 215—215 of the levers 216—216 are urged inwardly over the ramp toward each other by torsion springs 218—218 mounted on the posts 217—217. A reel 220 engaging a stop 219 (Fig. 11) positioned at the bottom of the chute 196 engages the cam portions 215—215 of the levers 216—216 and thrusts them outwardly away from each other, whereby curved pins 221—221 extending inwardly from the upper ends of the levers 216—216 are maintained in the path of a reel 222 and keep the reel 222 out of contact with the reel 220. A pair of escapement levers 225—225 (Fig. 1), which are identical with the levers 216—216, are held in positions in which they stop another reel (not shown) in a position just above the reel 222, and a reel 226 and the reel 208 are similarly held by levers illustrated by levers 228 and 229, respectively. Thus, all of the reels positioned on the ramp 196 are held from contact with each other.

When an operator of the machine 25 lifts the reel 220 from the chute 196, the torsion springs 218—218 mounted on the pins 217—217 (Fig. 1) and the force exerted by the reel 222 on the curved pins 221—221 thrusts the pins 221—221 apart, and the reel 222 then rolls down the ramp 196 to the position in which the reel 220 is shown. The other reels then move down the ramp one at a time in a similar fashion but are kept out of contact with each other by the levers 216—216 and the pins 221—221 and the levers and pins identical therewith. When the reel 165 moves to the position in which the reel 208 is shown, the cam portion 197 (Figs. 9 and 12) of the rider 200 is freed and the driven clutch member 180 moves back into operative engagement with the driving clutch member 177. Thus, when the next hook assembly is advanced over the receiving platform 190, the platform is raised and unloads a reel therefrom.

As described hereinabove, when the ramp 196 is filled, the receiving platform 190 cannot be raised by trip rolls 45—45 associated with hook assemblies 28—28 advanced therepast as the trip rolls are moved into engagement with the cams 166—166, and the reels carried by the hook assemblies will not be discharged onto the ramp 196. The reels on the hook assemblies, after the ramp 196 is filled, are unloaded by the unloader 21 onto a ramp 230 if the ramp 230 is not filled. If both the ramps 196 and 230 are filled, reels carried therepast by the hook assemblies are discharged by the unloader 22 into a ramp 231 provided the ramp 231 is not filled. If all the ramps 196, 230 and 231 are filled, the reels will be carried by the hooks until a reel in one of the ramps is taken therefrom to render operative the unloader associated therewith.

If it is necessary to withdraw the unloader 20 from the operation of the conveyer system described hereinabove, the table 185 and the levers 182—182 and 186—186 are swung through slightly less than 180° in a clockwise direction, as viewed in Fig. 9, to a position in which the table rests on the ears 187—187. This rotates a tooth 240 (Fig. 11) on the driven clutch member 180 almost 180° out of mesh with a tooth 241 on the driving clutch member 177. The tooth 240 is the only tooth on the clutch member 180, and the tooth 241 is the only tooth on the clutch member 177 and because of this and the fact that the rotation of the driving clutch member 177 is much less than 180° when the cams 166—166 are rotated by the trip rolls 45—45, the tooth 241 does not engage the tooth 240 when the cams 166—166 are engaged by the trip rolls so that no rotation of the driven clutch member 180 is caused. Hence, no unloading by the unloader 20 occurs. The unloaders 21 and 22 may be rendered inoperative in a similar manner if it is so desired.

A turner 227 (Fig. 1) positioned in advance of the unloader 22 is identical with the turner 132, and serves to turn through 180° the hooks 30—30 as the hooks are advanced therepast so that the hooks point in the direction in which they are advanced as they approach the loader 11.

*Operation*

In the operation of the conveyer described hereinabove, the hook assemblies 28—28 are advanced over the loader 11, which serves to load reels on the hooks 30—30 thereof which are empty, but does not affect hooks already carrying reels therepast. The hooks are then turned 180° by the turner 132 and are advanced toward the unloader 20.

If the unloader 20 is not filled with reels, the receiving platform 190 strips the reels from the hooks 30—30 carrying them and deposits them on the ramp 196. This continues until the ramp 196 is filled with reels, at which time the receiving platform 190 will not be actuated as a hook is advanced thereover. The ramps 230 and 231 are filled successively with reels, whereby the unloaders 21 and 22 do not discharge reels thereon, and, after all of the hooks carried by the chain 15 are filled with reels by the loader 11, the loader does not raise any more reels in the path thereof, until a reel is taken from one of the ramps 196, 230 and 231 so that an emptied hook approaches the loader 11.

The conveyer serves to maintain the ramps 196, 230 and 231 full of reels so that the machines 25, 26 and 27 need not be stopped for lack of reels. Any collision between a reel and another reel or a portion of the conveyer is prevented while the reels are handled by the conveyer. Furthermore, the conveyer serves to convey reels from the loading ramp 80 (Fig. 1) to the unloading ramps without attention by an operator thereof.

*Alternative embodiment (Figs. 14 and 15)*

An alternative embodiment of the invention for conveying box-like articles shown in Figs. 14 and 15 is similar to the first-described embodiment of the invention except that forked hooks 330—330 replace the hooks illustrated by the hooks 30—30 and a loading chute 380 of a loader 311, a carriage 366 of the loader 311, receiving platforms, of which a receiving platform 390 is shown, storage chutes, of which a storage chute 396 is shown, and riders, of which a rider 300 is shown, are substituted for the loading ramp 80 of the loader 11, the carriage 65 of the loader 11, the receiving platforms 190—190, the storage ramps 196, 230 and 231, and the riders 200—200, respectively.

Bottom tines 331—331 of the forked hooks 330—330 are spaced widely apart and enter between bed rolls 368—368, a stop roll 369 and a stop 370 of the carriage 366 when the carriage 366 raises a box-like article 367 into the path of the forked hook, and the forked hook is advanced over the carriage 366 with the tines 331—331 pointing in the direction they are advanced, that is, pointing toward an observer viewing Fig. 14. The bed rolls 368—368 support the article 367 above the tines 331—331 as the forked hook is advanced over the carriage 366, and the stop roll 369 and the stop 370 maintain the article centered relative to the forked hook. After the tines 331—331 are in positions directly below the article 367, the carriage 366 is lowered and the article 367 is left on the forked hook 330, which is advanced along the path of the conveyer. Another box-like article (not shown) may then be loaded on the carriage 366 from a loading ramp 380.

A box-like article 371 (Fig. 15) is shown as it is about to be unloaded by an unloader 320 from one of the forked hooks 330—330 as the forked hook is advanced past the unloader 320. As the forked hook is advanced over the receiving platform 390 of the unloader 320, a table 385, to which the right side, as viewed in Fig. 15, of the receiving platform 390 is pivotally secured, is raised by means (not shown) identical with the means described hereinabove for raising the table 185 (Fig. 11). As the table 385 (Fig. 15) is raised, it raises a brake shoe 386 having grooves 387—387, which receive rolls 388—388 in close fitting engagement therewith. Coverings 389—389 of the rolls 388—388 are composed of a rubber compound or other material having a relatively high coefficient of friction so that the rolls 388—388 are prevented from rolling by friction between the brake shoe and the coverings of the rolls. The receiving platform 390 is raised farther and the rolls 388—388 enter between and lift the article 371 from the tines 331—331, which are advanced out from under the article. At this time, the coverings 389—389 of the rolls prevent the article from moving relative to the rolls because of the friction therebetween.

After the forked hook 330 is advanced beyond the receiving platform 390, the table 385, the brake shoe 386, the receiving platform 390 and the article 371 lower by gravity. The left end, as viewed in Fig. 15, of the receiving platform 390 strikes a stop 395, and as the table 389, the brake shoe 386 and the right end of the receiving platform 390 continue to descend, the receiving platform tilts downwardly to the right and the brake shoe moves out of engagement with the rolls 388—388. The rolls 388—388 then are free to rotate and the box-like article rolls off of the receiving platform onto and down the storage chute 396.

The rider 300 having lobes 397 and 402 positioned in the path of the box-like articles is raised when the chute 396 is filled so that two articles engage the lobes 397 and 402. When this occurs, the rider 300 renders the unloader 320 inoperative by means (not shown) identical with those by which the rider 200 (Fig. 11) renders the unloader 20 inoperative. However, a recess 409 provides clearance for articles moving down the chute 396 so that the rider 300 only rocks when the chute 396 is not filled.

*Operation of alternative embodiment*

In the operation of the last-described conveyer, the loader 311 loads box-like articles illustrated by the articles 367 and 371 on the forked hooks 330—330 and the forked hooks are advanced past the loader with the tines 331—331 thereof pointed in the direction of travel. U-shaped guard rails 309—309 of the forked hooks aid in holding the articles against side-wise movement on the forked hooks. Before the forked hooks reach the unloader 320, they are turned to positions in which the tines thereof point opposite to the direction of travel. The receiving platform 390 takes one at a time the articles from the forked hooks and deposits the articles on the chute 396. Before the unloaded forked hooks reach the loader 311 again, each is turned so that it points in the direction of travel to be in position to pick up another article.

The above-described conveyers effectively load, convey, unload and store articles of different types entirely automatically and without fouling of the articles or elements thereof. The articles are handled gently but positively and surely throughout their handling by the conveyers.

What is claimed is:

1. A conveyer, which comprises an endless conveyer element, an elevated track for guiding the conveyer element along a predetermined path, an article-engaging element carried by the conveyer element, means for advancing the conveyer element along the track, an elevator positioned adjacent to the track for positioning an article in the path of the article-engaging means, a trip roll carried by the conveyer element a predetermined distance in advance of the article-engaging element, means for controlling the operation of the elevator, an L-shaped cam normally in the path of the trip roll for actuating the elevator-controlling means when struck by the trip roll to cause the elevator to move an article into the path of the article-engaging means, said L-shaped cam having a dwell portion which is engaged by the trip roll until the article is engaged by the article-engaging means, a second cam, and a link for connecting the first cam and the second cam for movement together, said second cam being movable into the path of the trip roll when the trip roll strikes the first cam and serving to move the first cam into the path of the trip roll when the second cam is struck by the trip roll, said second cam being spaced a predetermined distance in advance of the first cam.

2. In a conveyer, an article-supporting means, means for advancing the article-supporting means along a predetermined path, an elevator for raising an article into the path of the article-supporting means to load an article on the article-supporting means, pneumatic means for raising and lowering the elevator, a supply line for supplying the pneumatic means with air under pressure, a four-way valve positioned in the supply line for controlling the pneumatic means, an arm for controlling the four-way valve, means carried by the advancing means for striking the arm to actuate the four-way valve to raise the elevator when the article-supporting means approaches the elevator, a second arm for actuating the four-way valve to lower the elevator, said striking means serving to strike the second arm after the article-supporting means has been advanced past the elevator to actuate the four-way valve to lower the elevator, a second valve positioned in the supply line in series with the four-way valve, and means for closing the second-mentioned valve prior to the time the striking means strikes the first-mentioned arm if the article-supporting means carries an article as it approaches the loading means.

3. In a conveyer, a hook, means for carrying the hook along a predetermined path, means positioned adjacent to said path for positioning a reel in the path of the hook as the hook is advanced theretoward, means for pointing the hook in the direction it is advanced as it is advanced toward the positioning means, pneumatic means for driving the positioning means, means carried by the carrying means for actuating the pneumatic means to cause the positioning means to position a reel in said path when the hook is advanced theretoward, a valve for preventing the operation of the pneumatic means when closed, a solenoid for closing the valve when energized, a switch for controlling the energization of the solenoid, a counterweighted shoe positioned adjacent to the positioning means for closing the switch to cause the energization of the solenoid when engaged by a reel carried by the hook as it is advanced toward the positioning means, whereby the positioning means is not driven when the hook carries a reel as it is advanced toward the positioning means, and means operable by the pneumatic-means-actuating means for opening the valve after a reel is carried by the hook beyond the positioning means.

4. A conveyer, which comprises means for carrying articles along a predetermined path, means for loading articles on the article-carrying means positioned at a predetermined point along said path, fluid-pressure means including a supply line for operating the article-loading means, a valve in the supply line, a solenoid including an armature, means operable by an article on the article-carrying means for energizing the solenoid, a striker carried with the article along a predetermined path, said armature having an elongated slot extending longitudinally therein, and a cam having a lobe normally resting in one end of the slot for closing the valve when the solenoid is energized, said cam also having a lobe operable by the striker and movable into the path of the striker and so positioned that the striker actuates it only after the article has been moved past the loader, said slot in the armature providing clearance for the cam when the solenoid is deenergized so that the valve is not opened when the solenoid is deenergized and the cam lobe operable by the striker is in the path thereof.

5. In a conveyer, a track, an endless chain, means for advancing the chain along the track, an article-carrying element carried by the chain, a valve including a rotary valve stem, a vertically disposed solenoid including an armature, a vertically disposed cylinder positioned below and in alignment with the solenoid, a piston mounted in the cylinder, a piston rod having an elongated slot formed therein for connecting the armature to the piston, an arm projecting into the elongated slot in the piston rod for connecting the piston rod to the valve stem, means for energizing the solenoid, whereby the piston rod and the piston are drawn upwardly and the piston rod moves the armature to turn the valve stem, the armature, the piston rod and the piston dropping when the solenoid is deenergized, the slot in the piston rod providing clearance for the arm when the piston rod drops, an adjustable needle valve positioned in the lower end of the cylinder for permitting air to enter the lower end of the cylinder, trap means for preventing passage of air past the piston when the piston is moved upwardly and for permitting passage of air past the piston when the piston is moved downwardly, tripping means carried by the endless chain, and a cam connected with the valve stem and the arm and movable into the path of the tripping means when the solenoid moves the arm, said tripping means serving to move the cam to turn the valve stem and move the arm against the bottom of the slot.

6. In a conveyer, means for conveying articles along a predetermined path, a loader positioned adjacent to a point in said path for positioning an article on the conveying means, means including a normally open switch for preventing the operation of the loader when the switch is closed, a shoe, a pair of arms pivotally attached to the shoe for closing the switch, means for pivotally mounting the arms in positions in which the shoe is in the edge of the path of an article carried by the article-conveying means as the article approaches the loader, said shoe being movable out of the path of the last-mentioned article when pushed thereby, whereby the arms close the switch, one of said arms being longer than the other so that the shoe is tilted in one direction when not engaged by the last-mentioned article but is tilted in another direction as that article moves out of engagement with the shoe.

7. In a conveyer, a hook, means for advancing the hook along a predetermined path with the hook pointed in the direction of its travel, a loader positioned adjacent to a point in the path of the hook for positioning a reel in the path of the hook so that the hook engages the reel as it advances past the loader, means including a normally open switch for preventing the operation of the loader when the switch is closed, a shoe, a pair of arms pivotally attached to the shoe for closing the switch, and means for pivotally mounting the arms in positions in which the shoe is at the edge of the path of a reel carried by the hook as it approaches the loader, said shoe being movable out of the path of the last-mentioned reel when pushed thereby, whereby the arms close the switch, one of said arms being longer than the other so that the shoe is tilted upwardly when not engaged by the last-mentioned reel but is tilted downwardly as that reel moves out of engagement with the shoe.

VINCENT A. RAYBURN.
DUER C. ROBSON.

REFERENCES CITED

The following references are of record in the file of this patent:

UNITED STATES PATENTS

| Number | Name | Date |
|---|---|---|
| 989,543 | Geissinger | Apr. 11, 1911 |
| 1,382,412 | Campbell | June 21, 1921 |
| 1,930,607 | Brown | Oct. 17, 1933 |
| 1,951,400 | Dvorak | Mar. 20, 1934 |
| 2,012,397 | Mattler | Aug. 27, 1935 |
| 2,298,704 | Knox | Oct. 13, 1942 |